United States Patent [19]

Hatamura

[11] Patent Number: 4,491,028

[45] Date of Patent: Jan. 1, 1985

[54] PRESSURE TRANSDUCER

[76] Inventor: Yotaro Hatamura, 2-12-11 Kohinata, Bunkyo-ku, Tokyo, Japan

[21] Appl. No.: 479,075

[22] Filed: Mar. 25, 1983

[30] Foreign Application Priority Data

Mar. 31, 1982 [JP] Japan .................................. 57-52940

[51] Int. Cl.³ .............................................. G01L 1/26
[52] U.S. Cl. .............................. 73/862.62; 73/862.58; 73/862.65
[58] Field of Search ........... 73/862.38, 862.58, 862.62, 73/862.64, 862.65

[56] References Cited

U.S. PATENT DOCUMENTS 2,472,047  5/1949  Ruge .................................. 73/862.38
2,934,092  4/1960  Saunders ....................... 73/862.58 X
3,309,921  3/1967  Eckard et al. .................... 73/862.65

FOREIGN PATENT DOCUMENTS 124169  9/1979  Japan .

Primary Examiner—Charles A. Ruehl
Attorney, Agent, or Firm—Wenderoth, Lind & Ponack

[57] ABSTRACT

A pressure transducer having two through holes extending in one direction and a additional two through holes in another direction in a detection block such that they cross each other. The transducer has a pressure receiving portion located in the center of the detection block and surrounded by the through holes, and a retaining portion located around the periphery of the detection block and surrounding the pressure receiving portion. The pressure receiving portion is connected to the retaining portion through parallel upper and lower thin wall portions which are formed continuously between the upper wall of the through holes and the upper surface of the detection block, and between the lower wall of the through holes and the lower surface of the detection block.

13 Claims, 9 Drawing Figures

PRESSURE TRANSDUCER

BACKGROUND OF THE INVENTION

The present invention relates to a pressure transducer wherein through holes are bored in a detection block portion such that easily-deformable parallel thin portions are formed between the upper and lower hole walls of the through holes and the upper and lower surfaces of the detection block portion.

When a tunnel is excavated in soft ground by a shield excavator while the amounts of excavated earth and exhausted earth are balanced, earth excavated by the rotary cutter of the excavator is packed into a chamber separated by bulkheads, and it is detected whether or not the earth pressure in the chamber is exactly equal to the static earth pressure at a facing which keeps the facing stable. An earth pressure cell employed for this purpose must be able to deliver a correct mean stress constantly even when it receives a concentrated eccentric load owing to the presence of pebbles and the like. A similar ability is also needed, and actually tried to be sought, in various fields of technology, such as when an investigation is made of the forces on the inside of a silo for the purpose of designing and controlling the silo.

The inventor of the present application has suggested several types of load converters which can meet the aforementioned requirements, some of which will be described hereinafter.

One is the constitution wherein parallel flat plates are formed by boring a through hole having a square sectional shape in a detection block. This structure is shown in Japanese Patent Application published under No. 124169/1979.

Another is the improved constitution wherein a through hole is provided by cutting off the section between two small round holes and connecting them instead of having a square hole, in view of such inconvenience as in preparation of the parallel flat-plates by a through hole of square section. This is not only very easy to prepare but also capable of fulfilling a function equivalent to the function of the aforesaid parallel flat plates. This is disclosed in my co-pending U.S. patent application Ser. No. 433,109 filed Oct. 6, 1982.

In order to facilitate the understanding of the present invention, an outline of the invention disclosed in the aforementioned co-pending U.S. application is explained with reference to FIG. 1.

In FIG. 1, a detection block 1b is formed in the shape of a chest with rounded in surfaces as illustrated, and small round holes 3 are formed at upper and lower positions in the direction perpendicular to the longitudinal direction of the block. Extended through holes 2 are formed with their upper ends having a larger distance between them than that between the lower ends thereof, by connecting two round holes 3 together through a connection passage 4. A pressure receiving portion 5 located at the middle of the longitudinal detection block 1b, which is held between the two through holes 2 thus prepared, and retaining portions 6 located on both sides of the pressure receiving portion 5 are connected together by upper and lower parallel thin wall portions 7 formed between each of the upper and lower round holes 3 and the upper and lower surface of the detection block 1b against which the upper and lower round hole portions 3 confront. A pressure receiving plate 1a is formed above the pressure receiving portion 5 in a unitary structure, while a circular base 1c supporting the retaining portions 6 in a built-in beam manner is formed below the portions 6, and an opening 8 is formed in the base 1c. When the pressure receiving plate 1a is loaded in the axial direction, the pressure receiving portion 5 in the middle of the detection block 1b is displaced in the vertical direction so that its center of gravity moves parallel. Therefore, the displacement and the force applied can be determined by a displacement detection device or a force detection device provided underneath, and in addition, since compression and tension strains are generated in the parallel thin portions 7 which are each bent, strain outputs can be obtained by attaching four strain gages to the portions 7 and forming them into a Wheatstone bridge.

However, since the parallel thin portions located at four upper and lower portions are configured so that they extend in the same, single direction, the characteristics thereof and the results obtained are influenced by the direction of the load and differ in accordance with whether the direction of the load is the same as that direction or is perpendicular thereto.

Although it may be possible to improve the transducer by changing the linear format of the detection block 1b to cross-shaped format, such a change in format configuration still provides an opening 8 formed in either case between the detection block 1b and the base member 1c, and this brings about another disadvantage that the detection of the load transduced into liquid pressure of a liquid enclosed inside the circular base member 1c is impossible and the formation of an explosion-proof terminal box wherein an inactive gas is enclosed is also impossible with the structure of the known transducer.

SUMMARY OF THE INVENTION

An object of the present invention is to provide an improved load transducer which permits the elimination of the disadvantages of the known transducers.

Another object of the invention is to provide a load transducer which has improved eccentric load characteristics.

A further object of the invention is to provide a new load transducer in which the deformation of the structural body of the transducer is not transmitted to the detection portions thereof.

Another object of the present invention is to provide a load transducer wherein linearity and non-hysterisis characteristics, which are indispensable to a pressure gage, are guaranteed.

In the load transducer according to the present invention, two through holes are bored in each of two different directions in a detection block in such a manner that they cross each other. The load transducer has a pressure receiving member or portion located in the center of the detection block and surrounded by the through holes, and a retaining member or portions located around the periphery of the detection block and surrounding the pressure receiving portion. The pressure receiving portion and the retaining portion are connected to each other by upper and lower parallel thin wall portions which are formed continuously between the upper and lower hole surfaces of each through hole, and the upper and lower surfaces of the detection block. This structure attains the objects of the invention described above.

The pressure receiving portion of the detection block may have a shape of a square pyramid with a narrower base, or may have a shape of a square pillar by arranging the four through holes vertically.

A tubular protective housing may be connected to the base of the detection block with an annular gap formed between the inner surface of the housing and the outer surface of the detection block. The detection block has an annular recess to form a pressure receiving plate. A sealing material, such as cold-vulcanized silicone rubber, is provided between the periphery of the pressure receiving plate and the protective housing so as to seal the annular gap.

It is preferred that the detection block has an annular thin portion adjacent to the base so that the deformation of the structural body of the transducer is not transmitted to the detection portion thereof.

The detection block may have a recess at its one end opposite to the aforesaid pressure receiving plate so that the recess may include therein a liquid. The fluctuations of the liquid pressure can be indicated by a Bourdon tube.

Other objects and features of the present invention will become more apparent from the following description of the preferred embodiments of the invention, which will be made with reference to the accompanying drawings.

BRIEF DESCRIPTION OF THE DRAWINGS

In the drawings, as described above.

DETAILED DESCRIPTION OF PREFERRED EMBODIMENTS

Figure 1:
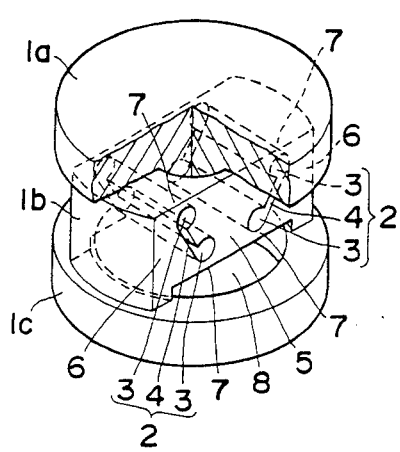
FIG. 1 is an explanatory perspective view of a pressure transducer disclosed in my copending U.S. patent application Ser. No. 433,109, filed Oct. 6, 1982, for the purpose of facilitating understanding of the present invention.
Figure 2:
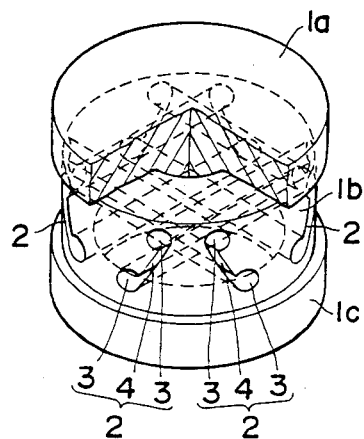
FIG. 2 is an explanatory perspective view of a pressure transducer embodying the present invention.
Figure 3:
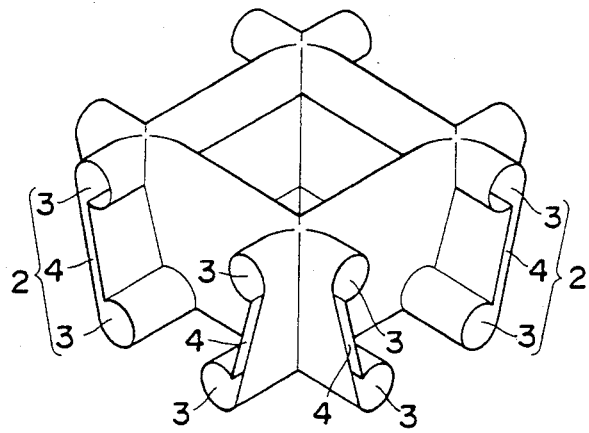
FIG. 3 is an explanatory illustration showing details of the hole part formed by crossing the through holes shown in FIG. 2.
Figure 4:
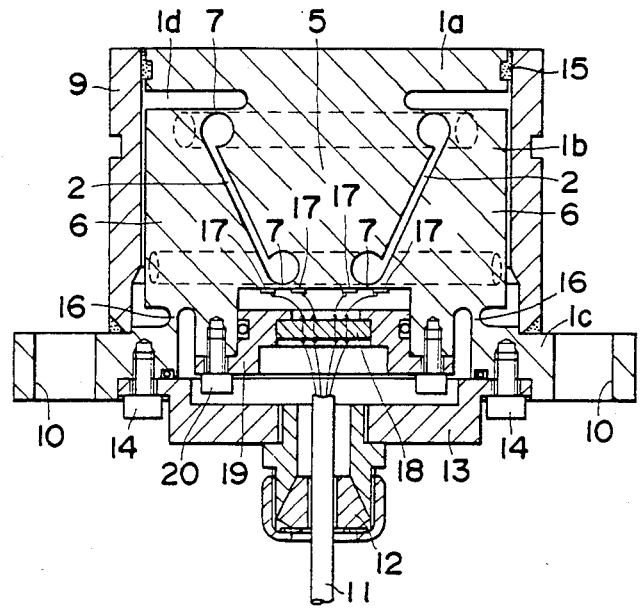
FIG. 4 is a sectional view of the pressure transducer based upon the embodiment of FIG. 2.

In FIGS. 2-4 illustrating one embodiment of the present invention, particularly FIG. 2 which is given to facilitate comparison with the structure of FIG. 1, a substantially cylindrical detection block $1b$ is provided with two through holes 2 bored in each of two different directions in the block such that they cross each other. The detection block has an annular recess $1d$ to form an integral end pressure receiving portion (hereinafter pressure receiving plate portion) $1a$. Accordingly, while the through holes in the structure of FIG. 1 extend in a single direction, on the other hand, the through holes in the apparatus of the present invention extend in two different directions which virtually cross each other, as illustrated. Similarly, the parallel thin portions 7 connect the central pressure receiving portion 5 of the detection block $1b$ to the retaining portion 6 in the upper and lower parts of the detection block $1b$. The thin portions 7 in the upper part of detecting block $1b$ are formed at the annular exposed surface surrounding the connection to pressure receiving plate portion $1a$ in the annular recess $1d$. As is apparent from FIG. 2, the thin portions, which are simply parallel in the structure of FIG. 1, are in a continuous square formation. Further, the part equivalent to, or corresponding to, the opening 8 in the structure of FIG. 1 is not provided in the structure of the present invention. The boring and cutting of the through holes and portions 5, 6, 7 can be readily formed precisely without substantial labor or difficulty.

Figure 5A:
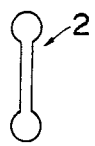
FIGS. 5A and 5B illustate modified shapes of the through holes according to further embodiments of the invention.
Figure 5B:
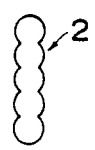

FIG. 3 illustrates the hole structure of the embodiment of FIG. 2 which is obtained by the four crossing through holes 2. The cross-sectional shape of each through hole 2 is not limited in any way to that shown in FIG. 3 in which two round hole parts 3, connected together with a connection hole part 4, extend in cross section in one direction, and can be modified to any other desirable configurations. For instance, the connection hole part 4 may be provided along the center line connecting two round hole parts 3 as shown in FIG. 5A, or may take the shape of a continuous hole formed by a plurality of round holes partly overlapping each other as shown in FIG. 5B. In the illustrated embodiment, the shape of the central pressure receiving portion 5 surrounded by the four through holes 2 is that of a square pyramid with a narrower base. This could also be formed as a square pillar by arranging the four through holes into a vertical configuration. Furthermore, the pressure receiving planar portion $1a$ which is formed integrally with detection block $1b$ can be formed in the shape of a threaded rod in an appropriate manner when the principle of the invention is applied to a load gage. In this way, appropriate alterations can be applied according to various uses thereof.

FIG. 4 illustrates a practical example of a structure on the basis of the constitution shown in FIG. 2. The pressure transducer has a protective tube 9 which is welded onto the base portion $1c$ so that a certain annular gap is formed between the tube 9 and the side surface of the pressure receiving plate portion $1a$, and a plurality of bolt holes 10 are provided in part of the base portion $1c$ which projects in the shape of a flange so as to make it possible to mount the device on various apparatuses, and a cover 13 having a receptacle 12 for a lead cable 11 is fitted to the base portion $1c$ by bolts 14. The annular gap between the pressure receiving plate portion $1a$ and the inner surface of the protective tube 9 is sealed at the periphery of the pressure receiving plate portion $1a$ with a soft elastic sealing material 15, which preferably is an injection molded piece of cold-vulcanized silicone rubber, so that the linearity and non-hysterisis characteristics which are material and indispensable to a pressure gage are guaranteed, and a complete sealing is ensured.

In the illustrated embodiment, the section in which the detection block $1b$ and the base portion $1c$ are connected is formed into a circular thin wall as indicated by reference numeral 16, so that the deformation of the structural body of the pressure transducer is not transmitted to the detection portion or is minimized if transmitted thereto. For the purpose of detecting strain in the lower parallel thin wall portions 7 by means of strain gages, four strain gages 17 combined into a Wheatstone bridge are attached thereto, so that a compression strain can be detected by strain gages attached to the side of the retaining portion 6, and tension strain can be detected by strain gages attached to the central pressure receiving portion 5. The strain gages 17 are connected to the lead cable 11 through the intermediary of a terminal board 18, the terminal board 18 being held by a retainer member 19 which fits in a seat inside the base portions 1c and held by bolts 20.

Figure 6:
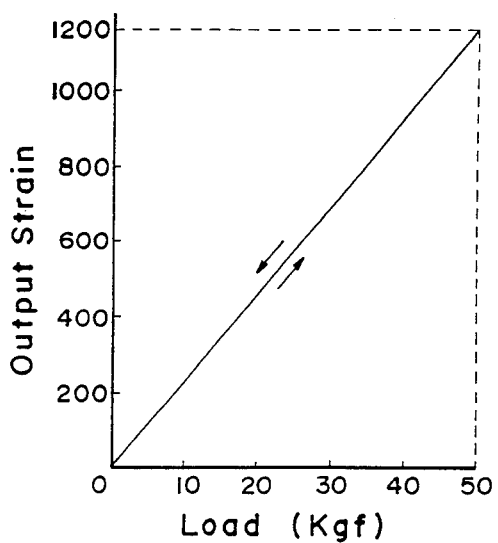
FIGS. 6 and 7 are diagrams which show the calibration curve in the pressure direction, and the eccentric load characteristics of the apparatus, respectively.

FIG. 6 illustrates a calibration line in the direction of the pressure applied to the device, which shows an excellent linearity and almost no hysteresis.

Figure 7:
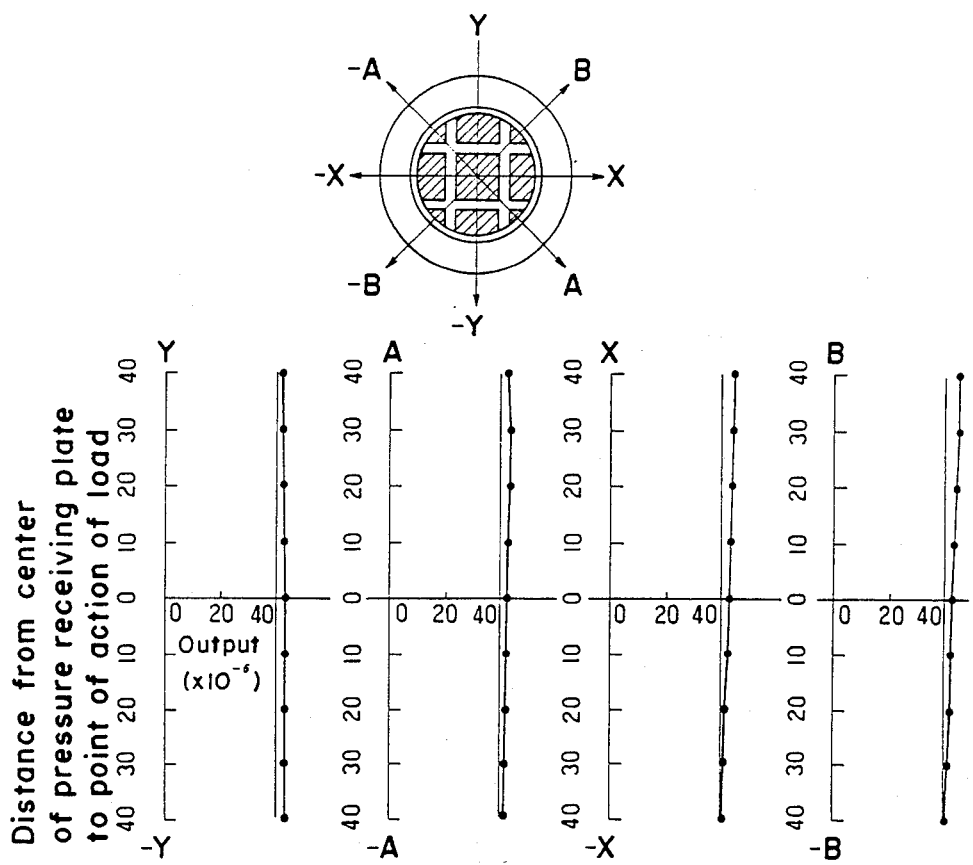

FIG. 7 shows the eccentric load characteristics of the device in which the strain outputs indicate a nearly fixed value irrespective of the eccentricity of the load acting point.

Figure 8:
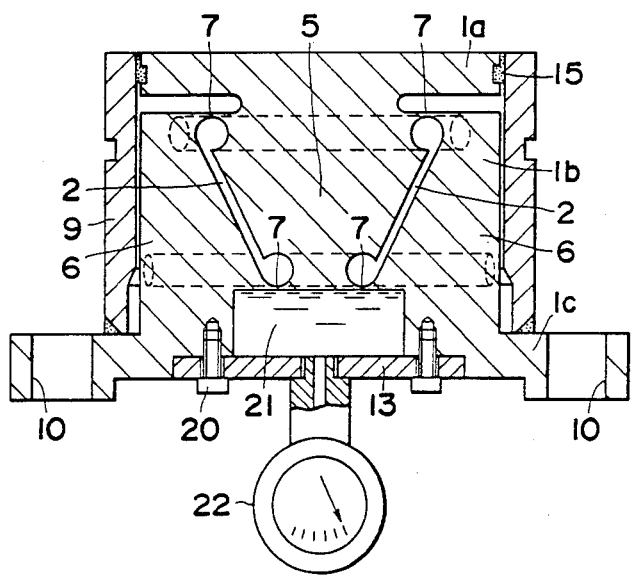
FIG. 8 is a sectional view of a pressure transducer according to another embodiment of the invention, illustrating direct indication by a Bourdon tube.

FIG. 8 shows a pressure transducer in accordance with another embodiment of the invention. In the modified transducer, the pressure on the pressure receiving plate portion 1a is transmitted to the central pressure receiving portion 5 and further to a liquid 21 enclosed inside the circular base portion and a cover 13, and the fluctuations of the liquid pressure thereof are indicated directly by a Bourdon tube 22. The other structure will be understood from the foregoing description and from the drawing, any further description will not be made.

As will be apparent from the foregoing, the pressure transducer according to the present invention provides further improvements in the eccentric load characteristics, in particular, while maintaining an ease of preparation which is relatively effective for mass production. Further, the present invention is excellent also in the sense that, after various transducing elements are arranged in a compartment formed in the space below the detection block 1b, they can be sealed up and separated from the surrounding space, or that detection through liquid-pressure conversion can be conducted by enclosing a liquid space, as in the embodiment of FIG. 8.

Although the present invention has been described with reference to the preferred embodiments, many modifications and alterations can be made within the spirit of the invention.

What is claimed is:

1. A pressure transducer comprising a substantially cylindrical detection block having a first axial end a second axial end, said detection block including:
   a first end pressure receiving portion connected to the remainder of said detection block at said first end, the remainder of said detection block having a cylindrical radially peripheral outer surface, two first through holes extending in one direction and two second through holes extending in another direction such that said first through holes cross said second through holes and each of said first and second through holes open at both ends thereof at said outer surface, said first and second through holes having a first side extending adjacent a first exposed surface of said detection block so as to define a first thin wall portion of said detection block between said first exposed surface and said first side of said first and second through holes, and having a second side adjacent a second exposed surface of said detection block so as to define a second thin wall portion of said detection block between said second exposed surface and said second side of said first and second through holes,
   a central pressure receiving portion in the center of said detection block, said central pressure receiving portion being surrounded by said first and second holes, and
   a retaining portion at the radial periphery of said detection block, said retaining portion surrounding said central pressure receiving portion,
   said central pressure receiving portion being connected to said retaining portion through said first and second thin wall portions.

2. The pressure transducer according to claim 1, wherein said first thin wall portion is parallel to said second thin wall portion.

3. The pressure transducer according to claim 1, wherein said central pressure receiving portion of the detection block has a shape of a square pyramid having an upper end at said first end a base narrower than said upper end, at said second end.

4. The pressure transducer according to claim 1, in which said central pressure receiving portion of the detection block has a shape of a square pillar.

5. The pressure transducer according to claim 1, wherein said detection block has a base, said transducer further comprising a tubular protective housing having an inner surface, mounted to said base of said detection block with a gap formed between said inner surface of said housing and said cylindrical outer surface of said detection block.

6. The pressure transducer according to claim 5, wherein said first end pressure receiving portion has a sealing material sealing the same to said housing.

7. The pressure transducer according to claim 6, wherein said sealing material is cold-vulcanized silicone rubber.

8. The pressure transducer according to claim 1, wherein said detection block has a base, said detection block having an annular thin wall part adjacent to said base so that the deformation of the structural body of the transducer is not transmitted to a detection part coupled to said base.

9. The pressure transducer according to claim 1, further comprising at the exposed side of said second thin wall portion of the detection block four strain gages for selectively detecting compression and tension strain.

10. The pressure transducer according to claim 9, wherein said four strain gages are combined into a Wheatstone bridge, two of said four strain gages being attached to said second thin wall portion adjacent said retaining portion and the other two of said four adjacent gages being attached to said second thin wall portion adjacent said central pressure receiving portion.

11. The pressure transducer according to claim 1, wherein said detection block has a recess containing therein a liquid exposed to said second exposed surface, said transducer further comprising an indication device connected to said liquid in said recess, thereby directly indicating the fluctuations of the pressure of said liquid.

12. The pressure transducer according to claim 1, wherein said first exposed surface comprises an annular surface at said first end, said first end pressure receiving portion being fixed to said remainder of said detection block inside the inner boundary of said annular surface, said second exposed surface being located at said second end.

13. The pressure transducer according to claim 12, wherein said detection block has an annular space formed between said first end pressure receiving portion and said remainder of said detection block at said cylindrical outer surface, said annular surface being exposed to said annular space.

* * * * *